INFORMATION HANDLING APPARATUS

Filed Aug. 2, 1961 4 Sheets-Sheet 1

INVENTORS
EDWARD S. FABISZEWSKI
BY RICHARD D. PASCIUTO

Fred Jacob
ATTORNEY

INFORMATION HANDLING APPARATUS

Filed Aug. 2, 1961 4 Sheets-Sheet 2

INVENTORS
EDWARD S. FABISZEWSKI
RICHARD D. PASCIUTO
BY
Fred Jacob
ATTORNEY

INFORMATION HANDLING APPARATUS

Filed Aug. 2, 1961 4 Sheets-Sheet 3

INVENTORS
EDWARD S. FABISZEWSKI
BY RICHARD D. PASCIUTO

Fred Jacob
ATTORNEY

Dec. 7, 1965 E. S. FABISZEWSKI ETAL 3,222,651

INFORMATION HANDLING APPARATUS

Filed Aug. 2, 1961 4 Sheets-Sheet 4

INVENTORS
EDWARD S. FABISZEWSKI
RICHARD D. PASCIUTO

BY [signature]
ATTORNEY

United States Patent Office
3,222,651
Patented Dec. 7, 1965

3,222,651
INFORMATION HANDLING APPARATUS

Edward S. Fabiszewski and Richard D. Pasciuto, Lexington, Mass., assignors to Honeywell Inc., a corporation of Delaware Filed Aug. 2, 1961, Ser. No. 128,753
10 Claims. (Cl. 340—172.5)

The present invention relates in general to new and improved control apparatus, in particular to apparatus responsive to the receipt of encoded input information for carrying out the transfer of corresponding data characters to an output data storage medium under completely verified conditions.

The primary function of output equipment which is in use with high-speed computing systems is to transfer the processed data to a more or less permanent storage medium where it is stored by printing, punching, magnetic recording, or the like. Since these data transfer operations must occur at very high speed, the possibility of error, which may be occasioned by the failure of mechanical equipment or by faulty circuitry, is relatively high. If the performance of the system is to be reliable, this data transfer must occur under completely controlled conditions so as to provide a degree of vertification of its accuracy no less than the verified accuracy of the data source.

Since the processed data can generally be supplied to the output equipment at a rate far in excess of the output equipment operating speed, it is important for the checking process associated with the operation of the output equipment not to cause any additional delay whereby the speed of over-all system operation is decreased. It is further desirable to keep the size and complexity of the output equipment including the checking apparatus to a minimum, in order to keep down the over-all cost of the system and the servicing time resulting from its operation.

A distinction must be made between on-line and off-line operation of the output equipment. In on-line operation, processed data is either transferred from the central processor of the computing system where the actual computations are carried out to the output equipment, or new data is sent to the central processor. In off-line operation, the input source of the processed data is generally a permanent storage medium such as magnetic tape, from which the data is transferred to an output device. Alternatively, new data, e.g., from punched cards, may be fed to the magnetic tape in off-line operation.

Considering the case where processed data is transferred to an output device, it will be clear that radically different conditions attend the operation of the output equipment in the on-line and the off-line modes. These different conditions may be due to a difference in the organization of the input data in the two modes, its content, to the manner in which it is received, its timing and to the different checking procedures required for each. So great are these differences, that it was generally considered impractical in the past to let the same control apparatus govern the operation of the output equipment in the respective modes. As a consequence, separate, independently operating control circuits were used which were adapted to operate under the different conditions encountered in the respective modes.

The disadvantages inherent in such an approach are clear. In a system of this kind, the output device which effects the actual transfer of data to the output storage medium requires separate control apparatus to communicate with each of the sources of input data, such as the magnetic tape and the central processor. Since an important portion of the apparatus thus required is functionally similar in both instances, a duplication occurs which is costly in terms of the equipment itself as well as in the over-all equipment servicing time required.

Accordingly, it is a primary object of this invention to provide apparatus for use with a computing system for controlling the transfer of encoded input information to an output data storage medium which is selectively usable in different operating modes.

A substantial saving can be effected by sharing such portions of the equipment as perform functionally in the same manner in on-line as well as in off-line operation. Accordingly, it is another object of the present invention to provide apparatus for controlling the transfer of data to an output data storage medium wherein functionally similar portions of the equipment are shared for on-line and for off-line operation.

Formidable obstacles are presented to the implementation of such multi-purpose equipment due to the widely different operating conditions under which the shared equipment must perform. It is important for the resultant equipment to be less complex, less costly and at least as fast as is the case where separate and independent control devices are used for on-line and off-line operation respectively. A major objection to such multi-purpose equipment has been the total service and maintenance time required which, more often than not, increases in geometric progression as the total amount of equipment is increased due to the interdependence of the various parts of the system. Since the breakdown of the control apparatus often disables the system for one or both modes of operation, the computer itself may have a period of enforced inactivity pending the elimination of the trouble. When the total cost of the equipment involved is considered, it will be apparent that so-called computer "down" time is a matter of prime economic concern which makes it imperative to keep the equipment as simple as possible.

Accordingly, it is another object of the present invention to provide relatively simple and economical control apparatus for use with a computing system for transferring input information to an output data storage medium in the on-line as well as in the off-line mode of operation, wherein the interdependence of the two modes of operation is minimized.

Apparatus for controlling the transfer of processed data to an output device in on-line operation is illustrated and described in a co-pending application by Charles J. Barbagallo and Richard D. Pasciuto entitled, Electrical Apparatus, Serial Number 113,351, filed May 29, 1961, and assigned to the assignee of the present application.

As described in that application, when the computer is operating in the on-line mode, data is received from the central processor to be re-synchronized and transferred to the peripheral memory by way of a buffer. After the memory is filled a pattern generator, which is synchronized to the recurring sequence of data characters, provides successive character codes for comparison with the contents of the peripheral memory. The determination of each true comparison results in the storage of an appropriate signal in a buffer whose contents are subsequently utilized to energize the print hammers. True comparison signals are further stored in a special section of the peripheral memory to be compared at a later time against the electrical echos resulting from the energization of the hammers in order to verify the proper printing procedure.

It is a further object of the present invention to provide a system wherein apparatus such as that described above may be further adapted for off-line operation while sharing existing equipment to the maximum possible extent.

In the present invention, input information from an off-line source, e.g., from magnetic tape, is re-synchronized, re-arranged and parity-checked before being placed into temporary storage in an associated coincident current core memory. Any incorrect data in the core memory is transferred out, re-constructed in correct form if possible, and is again stored in the memory. When the correct data is in the core memory it is re-arranged to a format acceptable to the output device and is again stored in the core memory. Thereafter, the apparatus is ready for the print and comparison phase described in the above-mentioned application, wherein a comparison of the stored data occurs with the output of a code generator, followed by printing in response to any true comparisons and an associated echo check.

The various novel features which characterize the invention are pointed out with particularity in the claims annexed to and forming a part of this specification. For a better understanding of the invention, its advantages and specific objects thereof, reference should be had to the following detailed description and the accompanying drawings in which:

In order to place the present invention into proper perspective, an explanation of the on-line operation is presented below with reference to FIGURES 1 and 2 which illustrate control apparatus of the type described and illustrated in the above-mentioned co-pending application Serial Number 113,351. The connecting lines which couple parts of the apparatus in FIGURES 1 and 2 have been designated A, B . . . E in both drawings so as to indicate their correspondence. The data organization adopted for on-line operation calls for 120 printed characters per line. This data, which is referred to as a record, is organized into 16 words prior to printing, i.e., 15 information words and one control word which contains information pertinent to the vertical format of the printed line. Each word consists of eight characters, each character being represented by a six-bit code. There are 56 different possible data characters. Each data word further has six parity check bits associated therewith. A word is thus represented by 54 bits.

Figure 1:
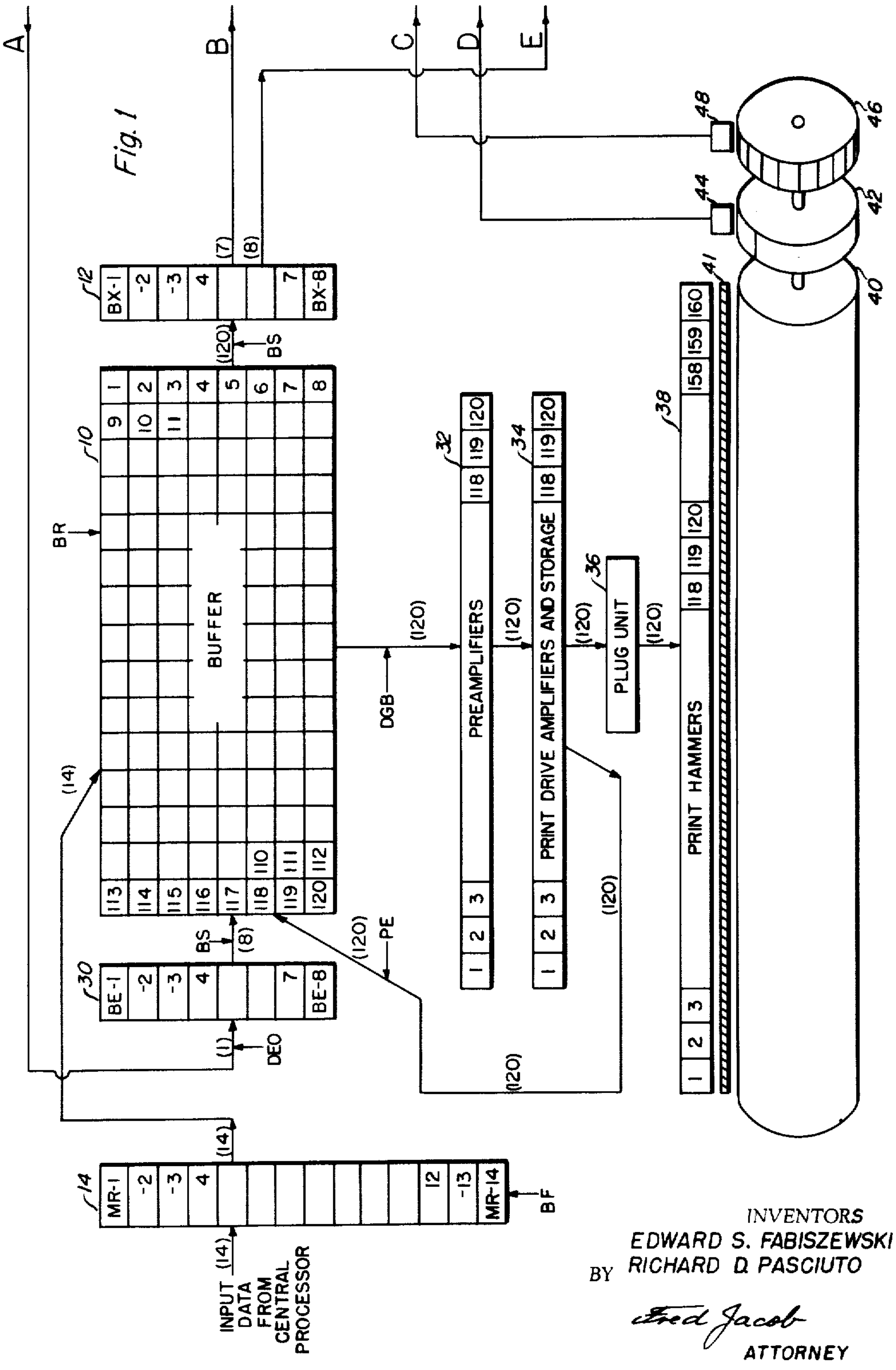
FIGURES 1 and 2 illustrate printer control apparatus for printing in the on-line mode.
Figure 2:
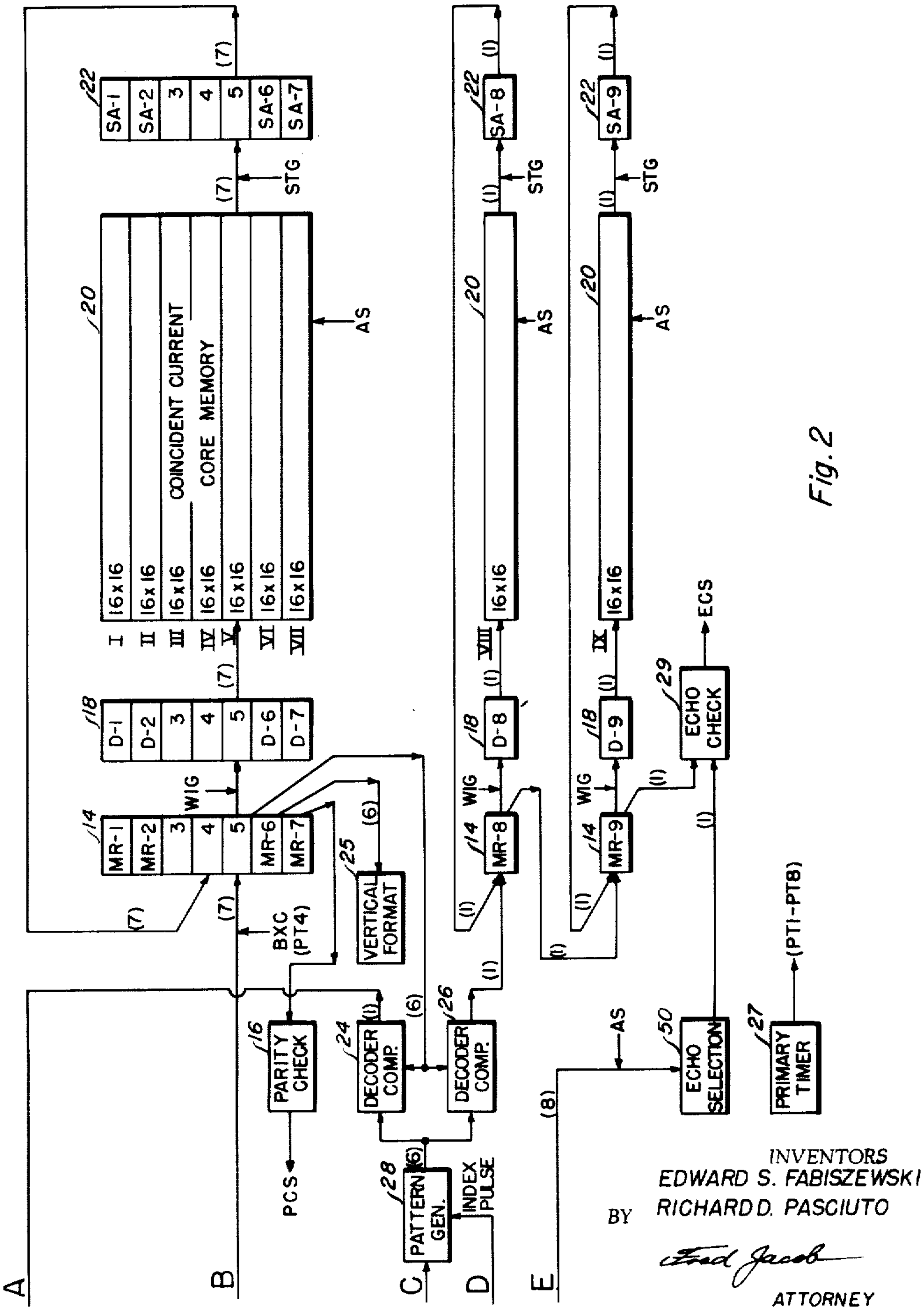

For the sake of illustration, a printer is used at the output of the control apparatus shown in FIGURES 1 and 2, although it will be understood that different output media may be employed for storing the output data. The printer is seen to include a print roll 40 with 56 rows of raised type fonts, each row having 160 fonts of a single data character. A print hammer unit 38 cooperates with the print roll so that, when one or more of its 160 print hammers is simultaneously driven against a confronting type font of the print roll, an imprint of the same data character is made in the corresponding spaces of the print line on an intermediately positioned paper web 41. The print roll 40 is adapted to rotate at a uniform rate together with an index disc 42 which has a single marker on its periphery and a character disc 46 which carries 56 markers. Each of the markers is adapted to produce an electrical pulse in cooperation with a pair of corresponding pickups 44 and 48 respectively.

The operation of the apparatus illustrated in FIGURES 1 and 2 is divided into discrete phases, i.e., the vertical format phase during which the paper web is positioned to obtain the desired line spacing, the loading phase during which information is loaded into the coincident current core memory 20 by way of the buffer 10, and the print and comparison phase. During the latter, the encoded data characters are compared against the character codes which correspond to the print roll character row next moving into printing position. Printing occurs and a check is made to determine whether or not the print hammers were energized in accordance with the data instructions provided. Suitable control signals ensure the appropriate operation of the apparatus for each different phase. Some of these phases of the operation overlap each other and certain operations take place concurrently as will be seen hereinbelow.

The various phases of the operation occur under the control of timing pulses which, although they may be referenced to the master clock of the central processor, occur nevertheless as dictated by conditions peculiar to the apparatus itself. For example, while the central processor may process data in accordance with the master clock pulses, the actual printing cannot occur until the paper web has been moved to the line on which printing is to take place. The paper web positioning process is necessarily independent of the electronic master clock. Similarly, once the paper web has been positioned, the various data characters can be printed only in accordance with their appearance opposite the printer hammers. This in turn depends upon the rate of rotation of the print roll 40 and is again independent of the computer master clock. As a consequence, the data arriving from the central processor must be re-synchronized prior to being fed into the buffer 10, in accordance with the timing requirements of the apparatus.

The aforementioned timing pulses are produced by the primary timer 27 which may take the form of a counter capable of counting up to eight before being reset. Eight basic periods are defined by the primary pulses PT1–PT8. Once the central processor is ready to supply a data word and the apparatus shown in FIGURES 1 and 2 is ready to receive it, the loading phase of the operation is initiated upon the receipt of a suitable conditioning signal from the central processor. The input information from the central processor is received by a memory register unit 14 in frames of 14 binary digits, as indicated by the number in parentheses above the schematic singleline connection shown. The register unit consists of 14 registers MR1–MR14, each essentially consisting of an "and-or" gate whose output is coupled to a flip-flop circuit. The assertive output of the latter is coupled back to the input of the "and-or" gate so as to enable it to store a binary digit by recirculation.

Upon being temporarily stored in the memory register unit 14, the 14-digit data frames are strobed into their corresponding locations of a buffer 10 under the control of a four-pulse signal BF. The buffer consists of 120 substantially identical gate buffer amplifiers. For the purpose of this discussion it will suffice to state that each gate buffer amplifier performs a logical "and-or" function, as well as amplification and that it is capable of receiving a single binary digit and storing it by recirculation. In accordance with the organization of the data chosen, the constituent units of the buffer are organized into 15 columns of eight units each.

Four transfers under the control of the BF signal are required to read a word consisting of 48 information bits and 6 parity check bits into the buffer. The BF signal serves not only to re-synchronize the incoming information in accordance with the requirements of the control apparatus, but further performs an addressing function by feeding successive groups of binary data digits into predetermined buffer locations. In this manner the data bits are re-arranged into columns of 6 according to the data characters they represent plus a parity bit, if any. It will be noted that only a portion of the buffer is utilized during the loading phase of the operation.

Each of the 54 bits of a word, once it is inserted into a gate buffer amplifier of the buffer 10, is allowed to recirculate on itself under the control of the buffer recirculation function BR. When needed, this data is read out of the buffer in primary timer synchronism under the control of buffer select signal BS which will cause one six-bit character at a time, and a parity check bit if any, to be transferred from the buffer to a buffer exit unit 12. The latter consists of eight identical gate buffer amplifiers BX1–BX8 which are similar in structure to those of the buffer, each buffer exit having 15 input lines.

Each of the latter is connected to a gate buffer amplifier of a separate buffer column in the same buffer row.

The buffer select signal which controls the readout of the buffer 10, is in turn controlled by an address selection function AS which also sequentially addresses the locations of the coincident current core memory 20. A different location is addressed during each memory cycle, the latter being defined by eight primary timer pulse periods. When the first character in the buffer, i.e., the contents of the buffer locations 1 through 7 are transferred to BX1–BX7, the first memory location is addressed so that the character may be subsequently stored there. During this time interval, the registers MR1–MR7 of the aforementioned memory register unit 14 are loaded from the output of the buffer exit unit, under the control of the buffer exit control signal BXC. These registers are illustrated twice in the drawings for the sake of completeness of the flow diagram. The contents of these registers are recirculated until they are written into the core memory 20 under the control of the write inhibit gate signal WIG. The latter signal controls the action of an inhibit driver unit 18 which comprises nine substantially identical write inhibit drivers D1–D9, the first seven of which are used in the transfer of the data from the memory register unit 14 to the coincident core memory 20.

For the purpose of the present discussion, the coincident current core memory 20 may be considered as having nine separate memory planes I–IX, each comprising a core matrix of 16 columns and 16 rows. A location in the core memory may be defined as including the corresponding cores in all of the core planes, although it will be clear from the discussion which follows that such a location may also refer to less than all nine planes. In the present context, only the core planes I—VII are employed, each core plane using a section of the matrix consisting of 16 columns and 8 rows. A different location is normally addressed during each memory cycle, each of said cycles being defined by eight primary timer pulse periods PT1–PT8.

A partiy check unit 16 is connected to the output of the memory register unit 14 and consists basically of an "and-or" gating structure in combination with a storage flip-flop. Its function is to provide a parity check each time a data word is transfered out of the memory register to ensure the veracity of the data coming from the memory register. In case of an error, the parity check output signal PCS may be used to actuate an alarm and/or to disable the apparatus.

The above-described operation is repeated on the succeeding address counts until the remaining 7 characters of the data word in the buffer have been read out. No further address advance occurs thereafter and the central processor is notified through suitable circuitry that another word is requested. When 16 data words have been read into the core memory, the loading phase of the operation is complete and a suitable signal, which may be derived from the 127th address count, will condition the apparatus for the subsequent phases of the operation.

Data readout from the core memory is accomplished under the joint control of the address selection function AS and a readout signal STG which enables the sense amplifiers SA1–SA7 of a sense amplifier unit 22 comprising nine substantially identical amplifiers. During each memory cycle one data character is transferred to the sense amplifiers SA1–SA7 where it is fed back to the memory registers MR1–MR7. There, each of the bits is recirculated and is available at the output of its corresponding register. If the data character is to be preserved, it is transferred back into the memory. It will be noted that parity checking takes place during each recirculation of a data character about the core memory.

During the print and comparison phase which follows, the information which is contained in the words 2–16 is fed character-by-character from the output of the registers MR1–MR7 to the decoder comparators 24 and 26 respectively. There it is compared against the output of a pattern generator 28 which provides a different character pulse code in response to each of the 56 character pulses derived from the pickup 48 during a single rotation of the print roll 40. Each character code is compared with the contents of each of the 120 memory locations which contain the information of the data words 2–16. The index pulse derived from the pickup 44 serves to reset the pattern generator to its initial position upon the completion of each revolution of the print roll 40.

Each true comparison causes the comparator 24 to transfer a "one" bit to the buffer entry unit 30. The latter comprises eight identical buffer entry circuits BE1–BE8, each of which provides a buffering and amplification function. The binary "one" is fed sequentially to all of the buffer entries BE1–BE8 and is accepted by one of them under the control of a signal DEO which is a function of AS. This process determines the buffer row of the particular buffer location to which the "one" bit is to be transferred and which corresponds to the core memory location that is simultaneously being addressed. The proper buffer column is determined by the buffer select signal BS, substantially in the manner described above in connection with the readout of the buffer. Since both of the signals DEO and BS depend upon the address selection function AS which at this time addresses the corresponding location of the core memory, the "one" bit is fed to the proper location in the buffer.

The process continues until 120 comparisons have been carried out in the decoder comparator 24 and a "one" bit is stored in the proper location of the buffer for each true comparison of the character under consideration. It will be noted that all 120 gate buffer amplifiers of the buffer are now employed. Accordingly, each "one" bit now stored in the buffer indicates that the particular character which was compared is to be printed in the corresponding space of the print line. Printing is accomplished by simultaneously reading the data stored in the buffer out to the 120 pre-amplifiers of a pre-amplifier unit 32, under the control of a buffer readout signal DGB. From the pre-amplifier unit 32 the signals are fed to the 120 units of a print drive amplifier and storage unit 34, whence they are transferred out to the print hammer unit 38 by way of a plugging unit 36. The latter can be selectively plugged in order to determine which 120 hammers of the 160 print hammer unit are to be actuated upon the receipt of appropriate impulse signals.

The operation described above is repeated until 120 comparisons have been made for each of the 56 different data characters on the print roll and the appropriate print-actuating signals for each character have been generated and sent to the printer. A line is thus printed substantially during a single revolution of the print roll. This is true regardless of the character with which the comparison phase is initiated.

The printer impulsing for each character is further used to derive echo checking signals which are obtained at the output of the print drive amplifier and storage unit 34 after being suitably delayed. They are applied to the buffer 10 under the control of a signal PE. From the buffer, the echo check signals are transferred to the buffer exit unit 12 under the control of the signal BS substantially in the manner previously explained. The output signal of the buffer exit unit is applied to an echo selection unit 50 under the control of the address selection function AS. The output signal of the echo selection unit 50 is applied to an echo checking unit 29.

Whenever the decoder comparator 24 transfers a "one" bit to the buffer 10 in response to a true comparison, the decoder comparator 26 sends a "one" bit to the memory core plane VIII by way of the memory register MR8 and the inhibit driver D8. The transfer of this signal occurs under the control of the write inhibit gating signal WIG. The signals which are thus transferred to the core plane VIII are stored by recirculating them about the core plane by way of the sense amplifier SA8, the output of which is connected to the memory register MR8. It will be understood that these true comparison "one" bits are stored at their proper locations under the control of the address selection signal AS. Subsequently, the true comparisons stored in the core plane VIII are transferred out to the core plane IX by way of the memory register MR9 and the inhibit driver D9. This transfer again occurs under the control of the signal WIG.

The storage of this data in the core plane IX also occurs under the control of the address selection function AS and is effected by recirculation via the sense amplifier SA9 whose output is connected to the input of the memory register MR9. The output of the latter is further connected to the aforementioned echo checking unit 29 where the true comparisons thus transferred down from the decoder comparator 26 are compared against the echos derived from the output of the print drive amplifier and storage unit 34. The echo checking signal ECS may be used to signal the absence of identity of the compared signals and/or to disable the apparatus.

It will be helpful to think of the various steps of the above-described print and comparison phase of the operation as occurring in respective cycles, which are defined by the 56 different characters spaced about the periphery of the print roll. Thus, the pattern generator code corresponding to the first data character, e.g., the character A on the print roll, is compared in the units 24 and 26 against 120 core memory locations, i.e., for 120 memory cycles, during the first print cycle. At the completion of the first print cycle, true comparison "one" bits are stored in the buffer 10 and in the core plane VIII for the character A.

During the second print cycle, a comparison is made for the next data character, e.g., the character B and true B comparisons are stored in the buffer 10 and in the core plane VIII. During the same print cycle, the true comparisons for the character A previously stored in the buffer 10 are used to impulse the pre-amplifiers of the unit 32 and are further transferred to the unit 34. Similarly, the true comparisons for the character A are transferred out of the core plane VIII and are stored in the core plane IX at the end of the second memory cycle.

During the third print cycle, the echo signals derived from the unit 34 for the character A are transferred to the echo checking unit 29 by way of the buffer 10, buffer exit 12 and an echo selection unit 50, the latter operating under the control of the AS function. In the echo checking unit 29 these signals are compared against the true comparisons stored for the character A in the core plane IX. Also during the second and third print cycles, the print hammers are energized from the output of the unit 34 and the actual printing of the character A occurs. Concurrently during the third print cycle, print impulsing of the pre-amplifiers occurs for the character B, while the code for the character C is compared against the contents of the 120 core memory locations with true comparisons being stored in the buffer 10 and in the core plane VIII.

The process described above continues, until all 56 data characters have been compared, echo-checked and printed so as to complete the printing of a single line on the paper web 41. The vertical format phase of the operation is subsequently initiated by reading out the control word contained in the memory locations 1–7 to the vertical format unit 25 and the paper web is moved to the position where printing of the subsequent line is to take place. Concurrently with the vertical format phase, the loading phase for printing the subsequent line is carried out. The initiation of the print and comparison phase for this line must await the completion of both the loading and the vertical format phases.

Figure 3:
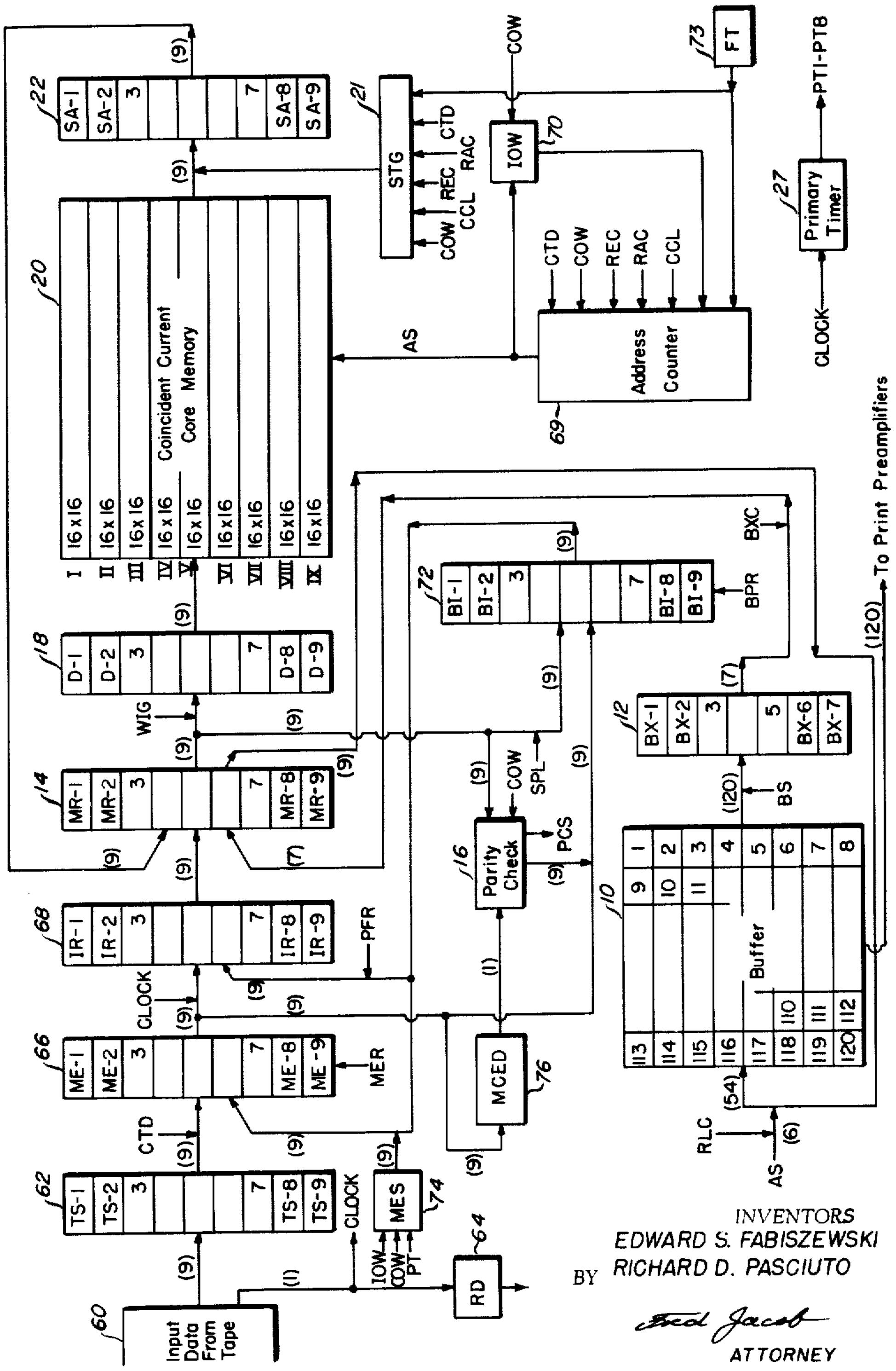
FIGURE 3 illustrates a preferred embodiment of the invention showing printer control apparatus for adapting existing equipment to off-line operation.

In the context of the discussion above, the invention which makes maximum use of existing on-line equipment will become clear from the following description. FIGURE 3 illustrates a preferred embodiment of the invention in flow diagram form, applicable reference numerals having been retained. For the sake of clarity, only those connections of the apparatus of FIGURES 1 and 2 are shown which are pertinent to the use of the equipment for off-line operation. Moreover, certain portions of the equipment such as the printer portion, which operates in substantially the same manner as in on-line operation, have been omitted to avoid redundancy. Conversely, certain portions of the apparatus of FIGURES 1 and 2 have been illustrated in greater detail in order to facilitate a complete understanding of the off-line operation.

Without so limiting the invention, the source 60 of input information has been assumed to consist of a magnetic tape and its associated readout equipment in order to illustrate the invention by means of a typical operating example. As in the case of FIGURES 1 and 2, the reference numerals in parentheses refer to the actual number of channels which are schematically illustrated by means of a single connection.

The data organization adopted in connection with the apparatus of FIGURES 1 and 2 wherein each word consists of eight 6-bit characters and six parity check bits is retained for off-line operation. However, as compared to the fourteen channel input from the central processor in FIGURES 1 and 2, the information is preferably recorded in nine channels on the magnetic tape with a further channel, which is centrally located on the tape and which is referred to as the clock channel, containing one clock pulse for each nine-bit data frame. For reasons which will become clear later, the recorded clock pulse trails the data frame on the tape by a predetermined interval. A data record in the present embodiment of the invention includes fifteen information words, one control word which pertains to vertical formating data, two check words for use in reconstructing data and one end-of-record word. The end-of-record word consists of the aforementioned clock pulses which are exclusively recorded in the clock channel. These pulses are applied to the primary timer 27 to provide a time standard for off-line operation.

Six 9-bit frames are required to transfer each 54-bit information word. The 9-channel output from the input data source 60 is seen to be coupled to a unit 62 which comprises nine substantially identical tape sense amplifiers TS1–TS9. The output of the clock channel is coupled to a record detector 64 which comprises a resettable delay circuit. The output of the tape sense amplifier is gated with a signal that is designated CTD and is coupled to a register 66 which comprises nine substantially identical gate buffer amplifiers ME1–ME9, each capable of storing a single binary digit by recirculation.

The output of the aforesaid register unit 66 is gated with the clock signal derived from the clock channel and is coupled to a gate buffering unit 68 which has nine substantially identical gate buffer amplifiers IR1–IR9. The output of the unit 68 is coupled to the memory registers MR1–MR9 of the memory register unit 14 which was discussed in connection with FIGURES 1 and 2. As in the case of FIGURES 1 and 2, the output of the memory register unit is connected to the inhibit driver unit 18, the latter, in turn being coupled to the core planes I–IX of the core memory 20. The core memory output is coupled to the sense amplifier unit 22 whose output is connected back to the memory register unit 14.

The above-mentioned address selection function AS which controls the operation of the core memory is seen to be derived from an address counter 69 which is capable of counting up to the count 255 to address every location of the 16 x 16 core memory. The inputs applied to the address counter are labeled CTD, COW, REC, RAC, CCL, FT and IOW. All but the last one of these signals may represent the output of a like-named flip-flop circuit which is coupled to the counter to influence its operation, as will be seen hereinbelow. The IOW signal is derived from a gate buffer circuit 70 which receives one of its inputs from the output of the address counter.

The FT signal is derived from a flip-flop 73 whose output is further coupled to a strobe gating unit 21. The latter, which provides the above-discussed STG signal for enabling the sense amplifiers SA1–SA9, is seen to receive the signals COW, CCL, REC, RAC and CTD at its input.

The output of the memory register unit 14 is coupled to the parity check unit 16 which further receives the aforementioned signals COW and FT at its input. Another input to the parity check unit is provided by a multiple channel error detector 76, which consists essentially of nine gate buffering units having recirculation to provide a storage function, and is connected to the output of the ME register unit 66.

A 9-channel connection from the output of the memory register unit 14 is gated with a signal SPL and is coupled to a binary accumulator 72. The latter comprises nine substantially identical flip-flops BI1–BI9 adapted to operate independently of each other to constitute nine independent one-stage counters. The 9-channel ouput of the binary accumulator is coupled to the input of the IR gate buffering unit 68 where it is gated together with a signal PFR. The output of the unit 72 is further connected to the ME register unit 66. The latter connection is gated together with the output of an ME register set unit 74 which is designated MES herein and which receives the aforementioned signals IOW, COW and PT at its input. The output of the ME register unit 66 is further coupled to the input of the binary accumulator 72 where it is gated together with the output of the parity check unit 16.

A 9-channel output of the memory register unit 14 is gated with a pair of signals AS and RLC and is coupled to the input of the buffer 10. Each of the nine channels is connected to six gate buffer amplifiers so as to constitute a 54-channel input. The buffer output is gated with the buffer select signal BS and is coupled to the buffer exit unit 12. The 7-channel output of the latter is connected to the memory registers MR1–MR7 of the unit 14.

As pointed out above, the operating conditions which are encountered in off-line operation differ radically from those in the on-line mode where the central processor provides synchronized 14-bit data frames at its 14-channel output. Where as in the instant case magnetic tape is used as the data source, the nine information pulses in each frame do not necessarily arrive in synchronism with each other. Variations may also occur within a given channel. Such conditions may be due to poor recording on the tape, delays occasioned by the readout equipment, tape skewing, etc. Unless corrected, the resultant lack of synchronism of the information in the respective channels may give rise to errors. Errors may also occur due to faulty recording on the tape in one or more channels or loss of data in reading out the tape.

Thus, it sometimes becomes necessary in off-line operation to correct erroneous input data or to supply missing input data by reconstructing the original information. To this end, a pair of check words is carried in the data stream which are used in conjunction with the parity check as will become clear hereinafter. The principle of using check word to reconstruct erroneous data is disclosed in a patent by William M. Kahn, number 3,037,697, entitled, Information Handling Apparatus, which is assigned to the assignee of the present application. In the context of the present invention this technique is employed in a novel way to provide a reliable off-line operation of the control apparatus disclosed herein.

The operation of the present invention, a preferred embodiment of which is illustrated in FIGURE 3, is divided into different phases. During the first phase, which is labeled the CTD phase herein, the information is loaded from the tape into the control unit and parity check errors, if any, are detected. During the COW phase of the operation which follows if errors were detected in the CTD phase, the tape channel or channels containing the erroneous data are determined. If sufficient information is present to reconstruct the information in correct form, this is done in the REC phase of the operation following the COW phase. During the subsequent CCL phase the information is rearranged into character format discussed in connection with the on-line mode and is stored in the core memory. The CCL phase may also occur immediately after the CTD phase if there are no errors, or it may follow the COW phase if the errors are incapable of correction. Thereafter, the print and comparison phase occurs during which the information is compared, printed and checked substantially in the manner described above in connection with the on-line operation of the apparatus of FIGURES 1 and 2. Following this phase, vertical formating occurs to position the paper to the line on which printing is to occur next.

In the following discussion of the operation of the invention, it should be kept in mind that the respective operating phases are controlled by like-named signals which may be derived from comparable flip-flop circuits. In order to simplify the explanation of the invention, these flip-flops are not shown in the drawing. It will be understood that, depending on the logical requirements of the circuit, the assertive as well as the negative flip-flop output signals may be employed.

The first phase of operation is initiated by the CTD signal which is applied to the strobe gating unit 21 and causes the sense amplifiers SA1–SA9 to be disabled by the resultant STG signal. The CTD signal further enables the registers ME1–ME9 to receive the incoming data. The FT signal from the flip-flop 73 remains set during the CTD phase to allow the address counter 69 to advance. The counting sequence is governed by the action of the CTD and RAC signals which jointly determine that every six consecutive counts be followed by the skipping of two counts. The address counter begins its sequence with the count 0 and the address selection function AS initially addresses the corresponding location of the core memory.

During the CTD phase, each clock pulse causes the primary timer 27 to provide eight PT pulses at its output to define successive memory cycles. Since the address counter advances in synchronism with PT8, a different memory location is addressed in each memory cycle during the CTD phase. With the sense amplifiers SA1–SA9 disabled, the contents of the addressed core memory locations are destroyed as they are read out, to make room for the incoming data.

At the initiation of the CTD phase the registers ME1–ME9 must be reset. This is carried out by means of the ME register reset signal MER which is a function of the applied clock pulses. It is further necessary to preset the binary accumulators BI1–BI9 which, although they are not used during the CTD phase, will find employment if there is to be a subsequent COW phase. This is conveniently carried out during the CTD phase by means of the binary preset signal BPR which is a function of the CTD signal.

The first 9-bit information frame is received and is transferred to temporary storage in the register unit 66 by way of the tape sense amplifier unit 62. As previously pointed out, such actions as tape skewing, etc., may cause the individual pulses from the tape sense amplifiers to vary from channel to channel and from frame to frame. The gate buffer amplifiers of the unit 66 perform a resynchronizing function by permitting the respective binary digits to collect before gating them simultaneously into the memory registers MR1–MR9 under the control of clock pulses derived from the clock channel. It will be recalled that the clock pulse associated with each data frame is so recorded on the tape as to have a predetermined delay with respect to the data frame. This delay period enables the bits to be collected before they are gated out.

The record detector 64, which is a resettable delay circuit, is set by the first clock pulse and remains in the set state provided clock pulses are applied at a predetermined rate, as governed by the magnetic tape speed and the clock pulses recorded on the tape. From the registers MR1–MR9 the data frame is transferred to the location 0 of the core memory by way of the inhibit drivers D1–D9 which are suitably gated by the write inhibit gating signal WIG. It will be noted that all nine core planes are employed. At time PT8 of the memory cycle, the address counter is advanced so that AS addresses the next location, i.e., location 1 of the core memory. The process described above repeats until the first word is stored in the core memory. Six frames are required for the forty-eight information bits and the six parity check bits which make up the first word to write it into the locations 0–5 of the core memory. As in the case of on-line operation, the first word in the control word is used solely for the vertical formating of the paper web.

The FT signal, which is derived from the flip-flop 73, is in the set state during the CTD phase to allow the address counter to advance under the joint action of the RAC reset signal and the CTD signal. The address counter subsequently skips from count 5 to count 8 so that the address selection function causes the second word, which is an information word, to be written into the core memory locations 8–13. This occurs substantially in the same manner in which the control word was loaded into the core memory. Subsequently, the RAC and CTD signals cause the address counter to advance to the count 16 and the next word is loaded into the locations 16–23 of the core memory. The process repeats until the last information word is stored in the memory locations 120–125. From a consideration of FIGURE 4 which illustrates one core plane of the coincident current core memory, it will be seen that each of the fifteen data words plus one control word which are now stored in the memory, occupies six memory locations in the same half-section of the memory. It will be understood that each location shown in FIGURE 4 applies to all nine core planes so that each address is representative of nine binary digits.

After the last information word is stored in the locations 120–125 of the core memory, RAC and CTD cause the address counter to skip to the count 128. Six successive memory locations are addressed and the first check word on the tape record is stored in the locations 128–133. The address counter then skips to the count 136 and the second check word is stored in the core memory locations 136–141.

The count of 141 causes the flip-flop which is responsible for the CTD signal to reset. IOW is reset in preparation for the COW phase and the address counter is returned to 0. RAC remains in the reset state while FT remains in the set state. The end of the record is determined by the absence of clock pulses which allows the unit 64 to return to its reset state. The resultant output signal of the unit 64 is employed to arrest the tape motion and to initiate the next phase of the operation.

While the information is loaded into the core memory during the CTD phase of the operation, a parity check is made of each frame that is transferred out of the memory registers MR1–MR9 by the parity check unit 16. If a parity error is found in one or more frames during the CTD phase of the operation, the parity check unit 16 is set and the PCS signal determines the next phase to be the COW phase. The flip-flop which is responsible for the COW signal is accordingly actuated by the output signal of the record detector 64.

In the COW phase, the channel or channels are determined which contain the errors detected during the CTD phase of the operation. The strobe gating signal from the unit 21, which prevented any output from the core memory during the CTD phase, is actuated by the COW signal to enable the sense amplifiers SA1–SA9. The contents of the core memory may thus be recirculated by way of the sense amplifiers, the memory register unit 14 and the inhibit driver unit 18. Under these conditions the binary accumulators BI1–BI9, which were preset by the BPR signal during the CTD phase, accumulate the output of the memory registers MR1–MR9 in binary fashion. Stated differently, since each binary accumulator is basically a one-stage counter in the form of an independently operating flip-flop circuit, the output of the registers MR1–MR9 is counted modulo 2 without a carry.

As in the CTD phase, the FT reset signal permits the address counter, which was reset to 0 at the end of the CTD cycle, to advance. The joint effect of the COW signal and the RAC reset signal on the address counter is to cause the count to skip by 16's starting from 0, until the address 128 is reached.

As previously explained, the IOW unit 70 consists essentially of a gate buffer amplifier connected to the output of the address counter. It is responsive to the occurrence of any of the addresses 128–133 and 136–141 during the COW phase to generate an IOW signal. In the particular situation under consideration, when the address counter reaches the count 128 the resultant IOW signal is applied to the address counter and sends it to the count 1. Accordingly, the corresponding location of the core memory is addressed.

As previously explained, the MES unit 74 is a gate buffer amplifier which receives the timing signal PT at its input as well as the signals COW and IOW. The MES output signal is used to gate the nine-channel output of the binary accumulator unit 72 into the gate buffer amplifiers ME1–ME9 of the unit 66. In essence therefore, the MES signal samples the output of BI1–BI9 into the unit 66 at a time determined by PT when the IOW signal occurs during the COW phase of the operation. It will be recalled that the binary accumulators were preset during the CTD phase. The coding of the data is so chosen that, unless an error occurred, each one of the binary accumulators BI1–BI9 will have accumulated to a reset state by the time the count 128 is reached. Therefore, if any one of the accumulators BI1–BI9 is in a set state at the time when the MES signal gates the output of the unit 72 into the gate buffer amplifiers ME1–ME9, it is indicative of the fact that the associated channel contains one or more errors. The signal in each channel in which there is an error will cause the corresponding ME gate buffer amplifier to set.

The IOW signal which is generated when the count 128 is reached further operates on the BFR signal to preset BI1–BI9 after the latter have been read out to the register unit 66. With the next counting sequence starting at the count 1, the COW and RAC signals again cause the address counter to skip by 16's and BI1–BI9 again accumulate the output of the registers MR1–MR9 modulo 2 without a carry. When the count 129 is reached, the process set forth above repeats and the counter is sent to the count 2. The action is continued until the location 133 is reached and the checking of the information associated with the first check word is complete.

Figure 4:
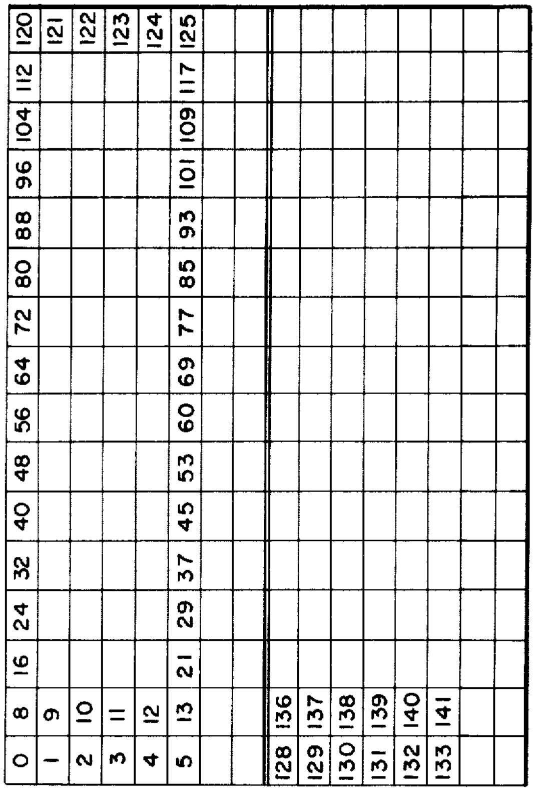
FIGURE 4 illustrates a core plane of the coincident core memory which is associated with the control apparatus.

From a consideration of FIGURE 4 it will be noted that the check word stored in the locations 128–133 of the core memory serves to check alternate information words stored in the memory starting at the locations 0–5, 16–21 . . . 112–117.

When the 133rd memory location is addressed, the action of the IOW and RAC signals sends the counter to the count 8 so that AS addresses a corresponding core memory location. A check is carried out of those words in the core memory which were previously skipped, i.e., the data words starting the locations 8–13, 24–39 . . . 120–125 respectively. This is done substantially as described above by means of the second check word which is stored in the locations 136–141. When the 141st location is addressed, the flip-flop which is responsible for the COW signal is reset to terminate the COW phase of the operation. Simultaneously, the address counter is sent to 0.

As previously explained, during the COW phase of the operation one or more of the gate-buffer amplifiers ME1–ME9 will be set depending upon the channel or channels in which errors occur. The multiple channel error detector 76 is so connected that it will set if more than one of the ME gate buffer amplifiers is set. An error in more than one channel, as thus indicated, is incapable of automatic correction. Accordingly, with the unit 76 in the set condition, the address count 141 in the COW phase is used to initiate the CCL phase of the operation during which the data is rearranged. Ultimately, the PCS output signal of the parity check unit 16, in response to the multiple channel error detect set signal, is employed to stop the operation of the system to permit checking of the errors by the operator.

If the multiple channel error detector 76 is not set during the COW phase of the operation, it serves as an indication that only a single channel is in error. The subsequent phase of the operation under these conditions is the REC or reconstruction phase which is initiated by the count 141. Concurrently, the parity check unit 16 is reset so as to be available for later use.

During the REC phase of operation the incorrect information which is stored in the core memory is reconstructed in correct form. This occurs under the joint control of REC and RAC, the latter signal remaining reset throughout this phase. The address counter will attempt to step through the same sequence of counts as in the CTD phase of the operation. However, the action of the FT signal causes the address counter to dwell on each count for two memory cycles so that the same memory location is addressed for two consecutive memory cycles. This is carried out by means of the FT reset signal at the end of the first one of the two memory cycles so that no counter advance can occur at the time. During the first memory cycle the strobing function STG is enabled and the contents of the addressed memory location are read out under the joint control of REC and FT. The information thus read out is transferred into the register MR1–MR9 via SA1–SA9 and is subsequently gated into the binary accumulators BI1–BI9 under the control of the signal SPL which is a function of PT, REC and FT. Concurrently, the frame parity of the contents of MR1–MR9 is checked by the parity checking unit 16. The information in the registers MR1–MR9 is further written into its proper location in the core memory under the control of the gating signal WIG. Thus, at the end of the first memory cycle the information previously contained in the addressed core memory location is again stored there, as well as being stored in the binary accumulators.

If a frame parity error is not detected during the recirculation of the contents of the addressed core location, the parity check unit 16 will be in its reset state which it retains during the second memory cycle. FT, which was reset at the end of the first memory cycle, is set at the beginning of the second memory cycle to permit the counter to advance at the termination of the latter. The joint action of the FT set signal and the REC signal on the stroke gating unit 21 causes the sense amplifier SA1–SA9 to be disabled during the second memory cycle and the contents of the addressed memory location are destroyed. However, these contents, which contain no errors, are preserved in the binary accumulator unit 72 whose output is now gated into the gate-buffer amplifiers IR1–IR9 under the control of the PFR signal which is a function of PT, REC and FT. From there, the information is transferred to the core memory by way of the memory registers MR1–MR9 and the inhibit drivers D1–D9. As before, the latter operate under the control of the write inhibit gating signal WIG. At the end of the second memory cycle, the contents of the addressed memory location will again be stored at their proper addresses.

If a frame parity error is detected in the first memory cycle during the recirculation of the data which is stored at the addressed core memory location, the parity check unit is set and will remain in this condition during the second memory cycle. During the latter cycle the addressed core memory location is cleared by disabling the sense amplifiers SA1–SA9, as explained above, but its contents, which contain an error, are preserved in BI1–BI9. It will be recalled that during the COW phase of the operation the particular one of the registers ME1–ME9 that corresponds to the channel containing an error was set. Under the control of the set parity check output signal, the output of ME1–ME9 is gated into BI1–BI9 and causes the binary accumulator which corresponds to the error channel to change its state. As a consequence of this action, the binary accumulators BI1–BI9 now contain the correct data that belongs into the addressed core memory location.

This information is gated into the gate buffer amplifiers IR1–IR9 under the control of the PFR signal and is subsequently transferred to the proper core memory location by way of the memory register unit 14 and the inhibit driver unit 18. At the end of the second memory cycle the proper information is contained in the particular core memory location which was addressed. With FT now set, the address counter advances to the next address. The parity check unit 16 is concurrently reset, and the BPR signal, which is a function of FT is applied to the unit 72 to preset BR1–BR9.

The foregoing process is repeated for subsequent memory locations which are addressed in the same sequence as occurred during the CTD phase of the operation under the joint control of the REC and RAC reset signals applied to the address container. Contrary to the action in the CTD phase however, the FT signal causes the address counter to dwell at each count for two memory cycles. At the count of 141, the flip-flop which is responsible for the REC signal is reset, and the address counter is sent to 0. At the same time, the flip-flop which is responsible for the CCL signal is set to initiate the CCL phase of the operation during which the data in the core memory is rearranged into a format suitable for subsequent printing.

The CCL phase may be initiated in different ways. It may occur immediately after the CTD phase when no errors are detected. It may follow the COW phase when errors are detected in more than one channel. Finally, it may succeed the REC phase. During the CCL phase, the information in the memory is rearranged from 9-digit frame format which includes 8 information bits and 1 parity check bit, into 7-digit frame format. The latter format corresponds to the data organization employed in on-line operation, wherein each data word consists of eight 6-bit characters plus six parity check bits.

FT is in the set state throughout the CCL phase to permit the counter to advance. This phase is initiated with the RAC signal in the reset state. The memory locations 0 to 5 are read out under the joint control of RAC reset and CCL. The latter signals operate on the address counter 69 as well as on the strobe gating unit 21. The strobing function STG enables the sense amplifiers SA1–SA9 and the 9-bit contents of each memory location that is addressed are transferred into the peripheral buffer 10 by way of the sense amplifier unit 22 and the memory register unit 14. This transfer requires a pair of signals AS and RLC to determine the address at which each bit is to be stored in the buffer. The RLC signal is a function of PT to satisfy the timing requirements, as well as being a function of RAC and CCL. Fifty-four bits are thus transferred as the locations 0–5 of the 9-plane core memory are addressed to constitute a data word of eight 6-bit characters plus six parity check bits. The decoding function is such that the fifty-four bits are stored in the buffer in the same relative positions as in the loading phase of the on-line operation.

When the count 5 is reached in the CCL phase with RAC reset, the address counter is sent to 0 and RAC is set. This allows the address counter to cycle through the addresses 0 to 7 in eight memory cycles. During these eight memory cycles the RAC set signal causes STG to disable the sense amplifiers SA1–SA9 so that the contents of the core memory locations 0–5 are destroyed. It will be recalled that no information was contained in the locations 6 and 7 of the memory and accordingly only the locations 0–5 need be cleared. Concurrently, the information word is read out from the buffer on seven channels, substantially in the manner discussed in connection with the on-line operation. This data is fed to the buffer exits BX1–BX7 under the control of the buffer select signal BS and is further transferred to the memory registers MR1–MR7 under the control of the signal BXC. From there, the data is transferred under the control of the write inhibit gating signal WIG to the locations 0–7 of the core memory by way of the write inhibit drivers D1–D7. It will be understood that only the core planes I–VII contain information in the locations 0–7. Parity checking of the 7-bit frame is carried out during this operation in substantially the same manner as in the on-line operation.

At the end of the memory cycle in which the address counter is at the count 7, RAC is reset and causes the buffer reset signal BR to clear the information contained in the buffer 10. The address counter advances by one count under the control of the RAC reset and CCL signals to cause AS to address the location 8 of the core memory. The operation described above is repeated with the contents of the memory locations 8–13 being read out of nine core memory planes. As before, this data is transferred to the buffer 10 and is decoded to form the subsequent information word. The latter is then read back into seven core planes of the core memory locations 8–15 when RAC is set. The address counter is thus advanced in multiples of 8 until the count 127 is reached. Since the check words stored in the core memory play no part in the subsequent printing and comparison phase of the operation, they are not rearranged. The count 127 thus represents the termination of the CCL phase and may be used to initiate the subsequent phase of the operation.

From the foregoing description and illustration of a preferred embodiment of the invention herein, it will be clear that the invention provides off-line control apparatus for use in a high-speed computer system, which successfully effects time-sharing of the functionally equivalent portions of the system that are used in on-line operation. This is carried out with relatively little increase in the size and complexity of the existing system and with substantially no decrease in its speed of operation. The system, moreover, is capable of completely independent operation in the two modes, so that no interruption of the operation in any given mode need occur due to a failure of the equipment which is exclusively used in the other mode of operation.

It will be apparent from the foregoing disclosure of the invention that numerous modifications, changes and equivalents will now occur to those skilled in the art, all of which fall within the true spirit and scope contemplated by the invention.

What is claimed is:

1. Apparatus for use in the operation of a computing system to control the transfer of data from a multiple-channel source to an output data storage medium, said data arriving in data frame format, each frame consisting of a single binary digit per channel, comprising a first temporary storage register adapted to receive each of said arriving data frames, a second temporary storage register, means for synchronously gating each data frame from said first to said second register, memory means connected to said second register having a plurality of individually addressable locations each adapted to store a data frame, addressing means and output means associated with said memory means, means including said second register and said output means for recirculating the contents of an addressed memory location, means for disabling said output means to clear an addressed memory location of its contents, means for checking the parity of each data frame transferred out of said second register, binary accumulating means coupled to said second register for independently accumulating the contents of each channel during a predetermined data sequence, said last-recited means in the absence of data errors being adapted to accumulate to a predetermined final state from a predetermined initial state, means for transferring the accumulated contents of said binary accumulating means to said first register, means for transferring data frames stored in successively addressed memory locations to said binary accumulating means, means responsive to a single-channel parity error condition for correcting a data frame stored in said binary accumulating means with the corresponding binary accumulation contents of said first register, and means for storing the correct data frames in their proper memory locations.

2. Apparatus for use in the operation of a computing system to control the transfer of data arriving in data frame format from a multiple-channel source to an output data storage medium, each data frame having a single binary digit per channel, comprising a first temporary storage register adapted to receive each of said arriving data frames, a second temporary storage register, means for synchronously gating each data frame from said first to said second register, memory means connected to said second register and having a plurality of individually addressable locations each adapted to store a data frame, addressing means and output means associated with said memory means, means including said second register and said output means for recirculating the contents of an addressed memory location, means for disabling said output means to clear an addressed memory location, means for checking the parity of each data frame transferred out of said second register, means coupled to said second register for binarily accumulating the contents of a predetermined data sequence independently in each channel, means for transferring said binary accumulation contents to said first register, means for transferring the data frame stored in an addressed memory location to said binary accumulating means, means for correcting said data frame in the event of a parity error in accordance with the corresponding binary accumulation contents in said first register, and means for storing the correct data in said addressed memory location.

3. Apparatus for use in the operation of a computing system to control the transfer of data from a multiple-channel source to an output data storage medium, said data arriving in data frame format, each frame consisting of a single binary digit per channel, comprising a first temporary storage register adapted to receive each of said arriving data frames, a second temporary storage register, means for synchronously gating each data frame from said first to said second register, memory means connected to said second register and having a plurality of individually addressable locations each adapted to store a data frame, addressing means and output means associated with said memory means, means including said second register and said output means for recirculating the contents of an addressed memory location, means for disabling said output means to clear an addressed memory location, means coupled to said second register for binarily accumulating the contents of a predetermined data sequence independently in each channel, means for coupling the accumulated contents of said last-recited means to said first register, means for transferring the data frame of an addressed memory location to said binary accumulating means, means for conditionally correcting said last recited data frame in accordance with the corresponding contents of said first register, and means for storing the correct data in said addressed memory location.

4. In a computing system having a central processor and an on-line control circuit for transferring data from said central processor to an output data storage medium, said circuit including buffer storage means, parity checking means and a coincident current core memory having input register means, output means and addressing means associated therewith, off-line control apparatus for transferring data from an external source to said medium comprising means for receiving successive multi-channel frames of data from said source, means for gating said data frames to said input register means, means for disabling said memory output means to clear respective core memory locations of their contents under the control of said addressing means, means for transferring said data frames from said input register means to respective ones of said memory locations under the control of said addressing means, means including said memory input register and output means for recirculating said data frames about their respective memory locations, said parity checking means being adapted to check each transfer of a data frame out of said input register means, means for transferring said data frames from said memory to said buffer storage means by way of said input register means, said last-recited transfer means being adapted to rearrange said data in a predetermined output format in said buffer storage means under the control of said addressing means, means for transferring said rearranged data to said memory, and means including said buffer storage means for transferring said rearranged data to said output data storage medium.

5. Apparatus as in claim 4 and further comprising binary accumulating means coupled to said input register means for independently accumuating the contents of individual channels during a predetermined sequence of data frames, said last-recited means being adapted to accumulate to a predetermined state in each channel in the absence of data errors, means for gating the contents of said binary accumulating means into said data receiving means, means for transferring said data frames from their successively addressed memory locations to said accumulating means, means responsive to the corresponding binary accumulation contents in said receiving means for correctly reconstructing an erroneous data frame in said accumulating means, and means for transferring correct data frames from said accumulating means to their proper memory locations.

6. Apparatus as in claim 5 and further including means responsive to said parity checking means to limit the operation of said reconstructing means to erroneous data frames.

7. Apparatus as in claim 6 and further comprising means coupled to said data receiving means for detecting the presence of errors in more than one channel, said last-recited means being adapted to cause said parity checking means to prevent any data reconstruction upon the occurrence of a multiple channel error.

8. Apparatus for use with a computing system to control the transfer of data arriving in frame format from a multiple-channel source to an output data storage medium, comprising memory means having a plurality of individually addressable locations each adapted to store a data frame, means for receiving each of said arriving data frames and for synchronously transferring it to a separate one of said memory locations, means for binarily accumulating the contents of a predetermined sequence of data frames stored in said memory independently in each channel, means for transferring the contents of said accumulating means to said data receiving means, means for transferring the data frame of an addressed memory location to said accumulating means, means responsive to the corresponding binary accumlation contents in said receiving means for correctly reconstructing an erroneous data frame in said accumulating means, and means for transferring correct data frames from said accumulating means to their proper locations in said memory means.

9. The apparatus of claim 8 and further comprising means for checking the parity of each frame in the data stream, said parity checking means being adapted to limit said data reconstruction to erroneous data frames.

10. Apparatus for use in the operation of a computing system to control the transfer of data from a multiple-channel source to an output data storage medium, said data arriving in frame format from said source, each data frame having a single binary digit per channel, predetermined groups of said binary digits being representative of data characters, said data characters being adapted to be combined into individual information words and check words respectively, comprising a first temporary storage register adapted to receive each of said arriving data frames, a second temporary storage register, means for synchronously gating each data frame from said first to said second register, a multiple-plane memory having a plurality of individually addressable locations each adapted to store one of said data frames, output means and addressing means associated with said memory, means for transferring data frames from said second register to selected ones of said memory locations in accordance with a first predetermined skip-sequence of said addressing means, means including said second register and said output means for recirculating the contents of an addressed memory location, means for disabling said memory output means to clear an addressed memory location of its contents, means for checking the parity of each data frame transferred out of said second register, means for recirculating each check word in said memory together with a group of information words selected in accordance with a second predetermined skip-sequence of said addressing means, binary accumulating means coupled to said second register for independently accumulating the contents of each channel during said last-recited sequence, said last-recited means being adapted, in the absence of data errors, to accumulate to a predetermined final state from a predetermined initial state, means for transferring said binary accumulation contents to said first register at the conclusion of each of said second skip-sequences, means for transferring the data frames from respective memory locations selected in accordance with said first skip-sequence to said binary accumulating means, error correction means responsive to a single-channel parity error condition of a data frame stored in said accumulating means for utilizing the corresponding binary accumulation contents of said first register to switch the affected channel of said last-recited frame, and means for transferring each correct data frame to its proper memory location.

References Cited by the Examiner

UNITED STATES PATENTS

| | | | |
|---|---|---|---|
| 2,954,731 | 10/1960 | Durand et al. | 101—93 |
| 3,037,697 | 6/1962 | Kahn | 235—153 |

MALCOLM A. MORRISON, *Primary Examiner.*